United States Patent [19]

Sohmiya et al.

[11] Patent Number: 4,962,394

[45] Date of Patent: Oct. 9, 1990

[54] TONER DENSITY CONTROL DEVICE FOR AN IMAGE RECORDER

[75] Inventors: Norimasa Sohmiya, Soka; Yasushi Koichi, Yamato; Kazunori Karasawa, Tokyo, all of Japan

[73] Assignee: Ricoh Company, Ltd., Tokyo, Japan

[21] Appl. No.: 330,480

[22] Filed: Mar. 30, 1989

[30] Foreign Application Priority Data

Apr. 1, 1988 [JP] Japan ........ 63-80953
Apr. 11, 1988 [JP] Japan ........ 63-88462

[51] Int. Cl.$^5$ ........ G01D 15/00

[52] U.S. Cl. ........ 346/160.1; 346/154; 364/519

[58] Field of Search ........ 346/154, 160.1; 364/519; 355/266, 265, 246

[56] References Cited

U.S. PATENT DOCUMENTS 4,829,336 5/1989 Champion ........ 355/246

*Primary Examiner*—Arthur G. Evans

*Attorney, Agent, or Firm*—Oblon, Spivak, McClelland, Maier & Neustadt

[57] ABSTRACT

A toner density control device for an electrophotographic copier, facsimile apparatus, printer or similar image recorder of the type developing an electrostatic latent image formed on a photoconductive element, or image carrier, by using a developer in the form of a toner. The device includes a switch accessible for commanding a shift of an adjustable range of image density from a designed or standard range particular to the image recorder. The switch allows a person to select image density higher or lower than the standard adjustable range as desired.

7 Claims, 7 Drawing Sheets

| Fig. 2A | Fig. 2B |
|---|---|

| |
|---|
| Fig. 3A-1 |
| Fig. 3A-2 |

| Fig. 4A | Fig. 4B |
|---|---|

TONER DENSITY CONTROL DEVICE FOR AN IMAGE RECORDER

BACKGROUND OF THE INVENTION

The present invention relates to an electrophotographic copier, facsimile apparatus or similar image recorder of a type for developing an electrostatic latent image which is formed on a photoconductive element, or image carrier, by using a developer that is implemented by a toner. More particularly, the present invention is concerned with a device applicable to such an image recorder for controlling the density of the toner used to form the printed image for a desired image density.

In an image recorder of the type described, the density of developed images is effected by the charge potential deposited on the image carrier, toner density, bias potential for development, etc. Among various image recorders to which the present invention pertains, an electrophotographic copier uses an image carrier in the form of a photoconductive element and, in operation, uniformly charges the surface of the photoconductive element, electrostatically forms a latent image on the charged surface by exposing the surface with an image. This is then developed as the latent image by use of a toner. The device then transfers the resulting toner image to a paper sheet. In this kind of copier, the image density is further effected by the intensity of exposure of the image. It has therefore been customary to maintain the toner density as constant as possible and to allow a person to adjust the charge potential on the image carrier before exposure, the intensity of exposure, the bias potential for development and the like in matching relation to desired image density. A toner density control device for maintaining the toner density constant has been proposed in various forms, as disclosed in Japanese Laid-Open Patent Publication (Kokai) No. 57-136667 by way of example. In the device of this Laid-Open Patent Publication, an electrostatic latent image is formed in a predetermined pattern on an image carrier and then developed by a toner which is fed from a developing unit to produce a toner pattern. The disclosed device includes a pattern density sensor responsive to the density of the toner pattern, a toner density sensor responsive to the density of a toner which is stored in the developing unit, and a toner supply device for supplying fresh toner to the developing unit. The device further includes a controller which sets up a toner density basis in association with the pattern density sensed by the pattern density sensor and, when the toner density sensed by the toner density sensor is lower than the toner density basis, actuates the toner supply device to supply a fresh toner to the developing unit.

As stated above, the charge potential on the image carrier and the intensity of exposure of the image and, therefore, the image density is adjusted on the assumption that the toner density is maintained constant at all times, thereby insuring stable image density. However, the adjustable range of image density is limited, i.e., it cannot be varied beyond a certain range which is set up at the production stage. It is therefore impossible for a user or a serviceman to increase or decrease the image density beyond the preset adjustable range. More specifically, a user expecting a variety of features of this type an image recorder may sometimes desire image density higher than the preset upper limit and sometimes image density lower than the preset lower limit for the purpose of saving toner. A machine capable of meeting as many of such demands as possible is useful. However, a desired image density which is either higher or lower than a designed range is not attainable unless various units constituting the image recorder are changed in both of hardware and process conditions. In such a situation, the user has to use another image recorder with which the desired density is available. The prior art control device, therefore, limits the applicable range of image recorders of the type described.

SUMMARY OF THE INVENTION

It is therefore an object of the present invention to provide a toner density control device which allows desired image density to be selected without resorting to any substantial change or modification of the hardware and process conditions of various units thereof and thereby achieves a broader range of applicability.

It is another object of the present invention to provide a generally improved toner density control device for an image recorder.

In accordance with the present invention, a toner density control device for an image recorder which develops an electrostatic latent image of a predetermined pattern formed on an image carrier by using a toner of a developer which is stored in a developing device comprises a pattern density sensor for sensing density of a developed image of the predetermined pattern, a toner density sensor for sensing toner density of the developer, a toner supply device for supplying toner to the developing device, a commanding device for commanding an amount of shift of the density of the image, and a control for setting a toner density basis in association with the density of the image sensed by the pattern density sensor and controlling the toner supply device in response to the amount of shift commanded by the commanding device, the set toner density basis and the toner density sensed by the toner density sensor such that the toner supply device is activated to supply toner to the developing device when the sensed density of the image is lower than density represented by a sum of the toner density basis and the commanded amount of shift.

Further, in accordance with the present invention, a toner density control device for an image recorder which develops by an imagewise exposing device an electrostatic latent image formed on an image carrier which has been charged by a charging device by using a toner of a developer which is stored in a developing device comprises a commanding device for commanding a value of an image forming parameter which has influence on density of the predetermined pattern to be developed, a pattern image forming device for forming the predetermined pattern image on the image carrier by using the image-forming parameter having the value commanded by the commanding device, a pattern density sensor for sensing density of the developed pattern image, a toner density sensor for sensing toner density of the developer, a toner supply device for supplying the toner to the developing device, and a control fro setting a toner density basis in association with the pattern image density sensed by the pattern image density sensor and controlling the toner supply device in response to the toner density basis and the toner density sensed by the toner density sensor such that the toner supply device is activated to supply the toner to the developing device when the sensed pattern image density is lower than the toner density basis.

BRIEF DESCRIPTION OF THE DRAWINGS

The above and other objects, features and advantages of the present invention will become more apparent from the following detailed description taken with the accompanying drawings in which:

FIGS. 2A and 2B are schematic block diagrams showing a specific arrangement of an electric circuit built in a control section of the copier shown in FIG. 1;

FIGS. 3A-1, 3A-2, 3B-1, 3B-2 and 3C are flowcharts demonstrating the operation of a microprocessor which is included in the control section of FIGS. 2A and 2B;

DESCRIPTION OF THE PREFERRED EMBODIMENTS

Figure 1:
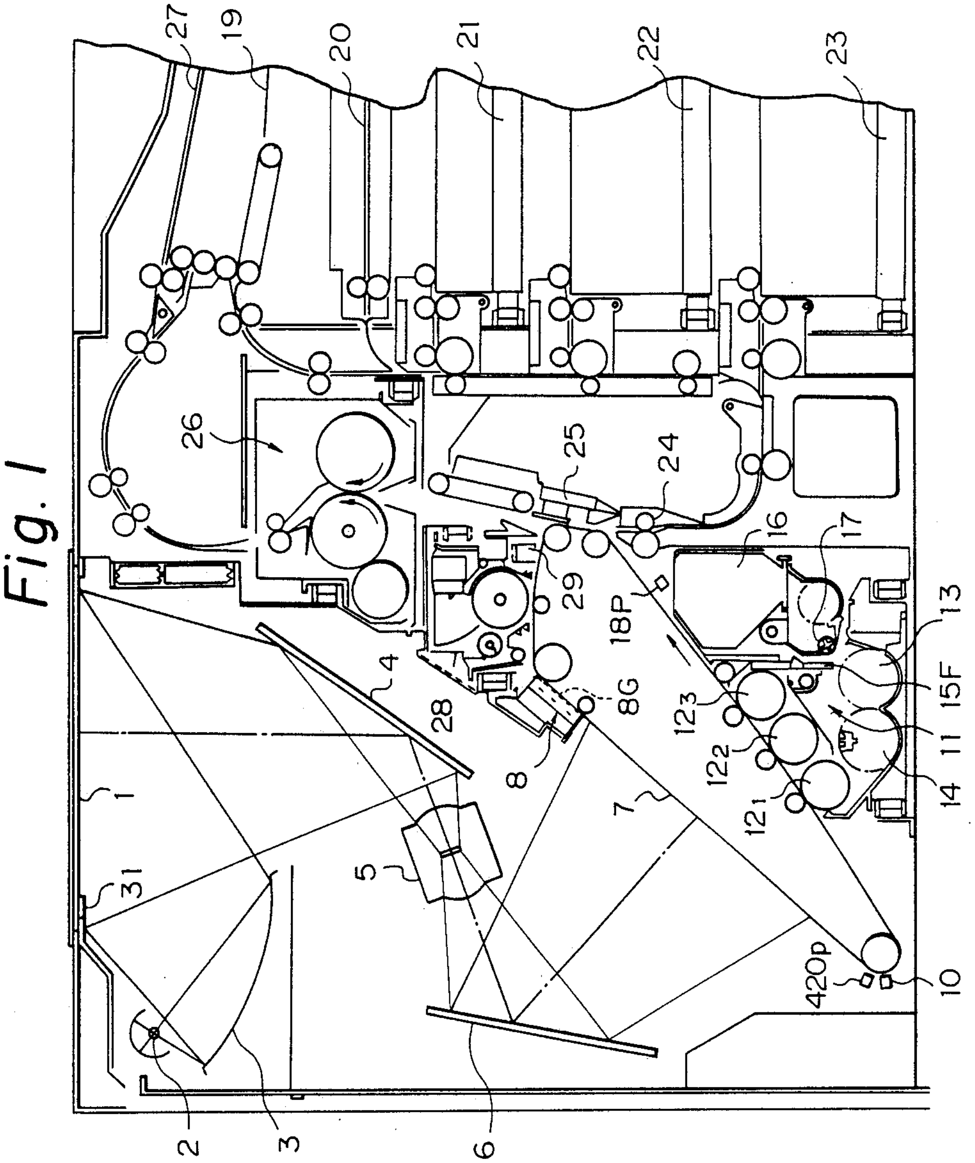
FIG. 1 is a side elevation showing essential mechanical arrangements of a copier to which preferred embodiments of a toner density control device in accordance with the present invention is applied.

Referring to FIG. 1 of the drawings, an electronic copier to which preferred embodiments of a toner density control device in accordance with the present invention are applied is shown and includes a glass platen 1 on which a document is laid. A lamp 2 illuminates the document on the glass platen 1 by way of a mirror 3. A reflection of the image from the document is propagated through a mirror 4, a lens unit 5 and a mirror 6 to be focused on a photoconductive element which may be in the form of a belt 7. A main charger 8 uniformly charges the surface of the belt 7, and the reflection of the image is focused on the charged surface to form an electrostatic latent image associated with the document. An eraser 10 erases the charge depsosited in those portions of the belt 7 which do not contribute to the image forming operation. A developing unit 11 includes developing brushes $12_1$, $12_2$ and $12_3$ for developing the latent image to produce a toner image.

A two-sided copy tray 19, a manual paper feed tray 20, a first tray 21, a second tray 22 and a third tray 23 are provided for selectively feeding paper sheets. A register roller 24 temporarily stops the movement of a paper sheet fed from any of such trays and then drives it at such a timing that the leading edge of the paper sheet arrives at a transfer and separation charger 25 when the leading edge of the toner image on the belt 7 being moved reaches the charger 25. The charger 25 transfers the toner image from the belt 7 to the paper sheet. The paper sheet with the toner image is transported to a fixing unit 26 so that the toner image is fixed on the paper sheet by heat. The paper sheet, or copy, coming out of the fixing unit 26 is driven out of the copier to a copy tray 27. After the image transfer, the charge remaining on the belt 7 is removed by a discharger 29 and, then, a cleaning unit 28 cleans the belt 7. The cleaned surface of the belt 7 is moved toward a main charger 8 to undergo another copying cycle.

An image pattern 31 is provided on one end portion of the underside of the glass platen 1 for the purpose of sensing the density of a toner image which is formed on the belt 7. An electrometer **420*p* senses a potential on the surface of the belt 7. The developing unit 11 stores a magnetic carrier thereinside. A toner is fed from a reservoir 16 to the developing unit 11 by a toner supply roller 17. In the developing unit 11, the incoming toner is mixed with the carrier by an agitator 13 while being charged due to its friction with the carrier. The toner and carrier mixture, i.e., a developer is fed toward the developing brush $12_1$ by a magnetic transporting brush 14 and from the developing brush $12_1$ to the other developing brushes $12_2$ and $12_3$ in sequence. The developer coming out of the developing brush $12_3$, i.e., the remaining toner and magnetic carrier not deposited on the belt 7 are partly returned to the agitator 13 along a path on which the sensing end of a toner density sensor 15F responsive to toner density in the developer is located. The other part of the toner and carrier is dropped into a lateral transport unit to be thereby conveyed laterally to the agitator 13. An image density sensor 18P is positioned downstream of the developing unit 11 for sensing image density in terms of an amount of toner deposited on the belt 7**.

Figures 2, 2A:
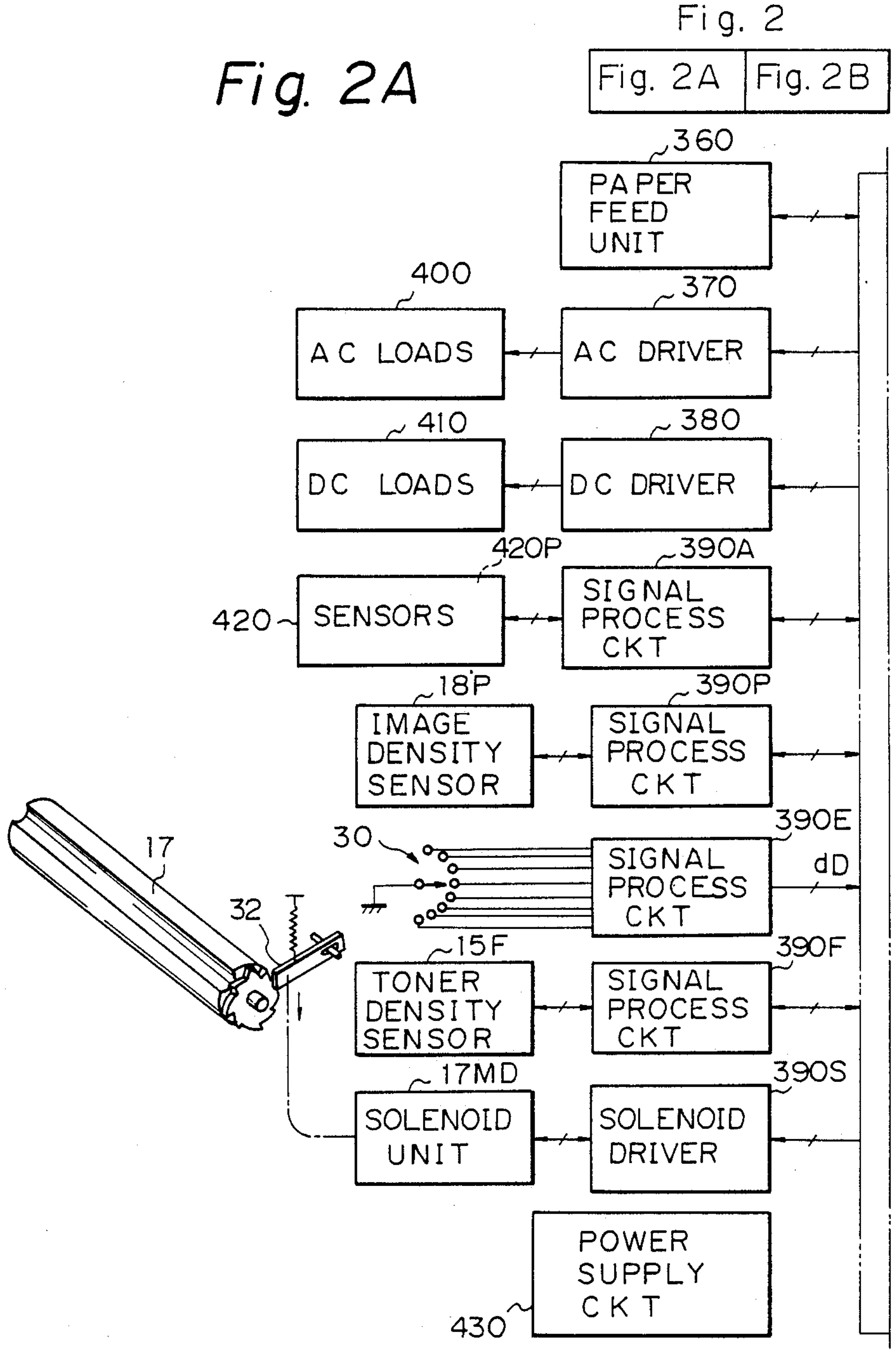
Figure 2B:
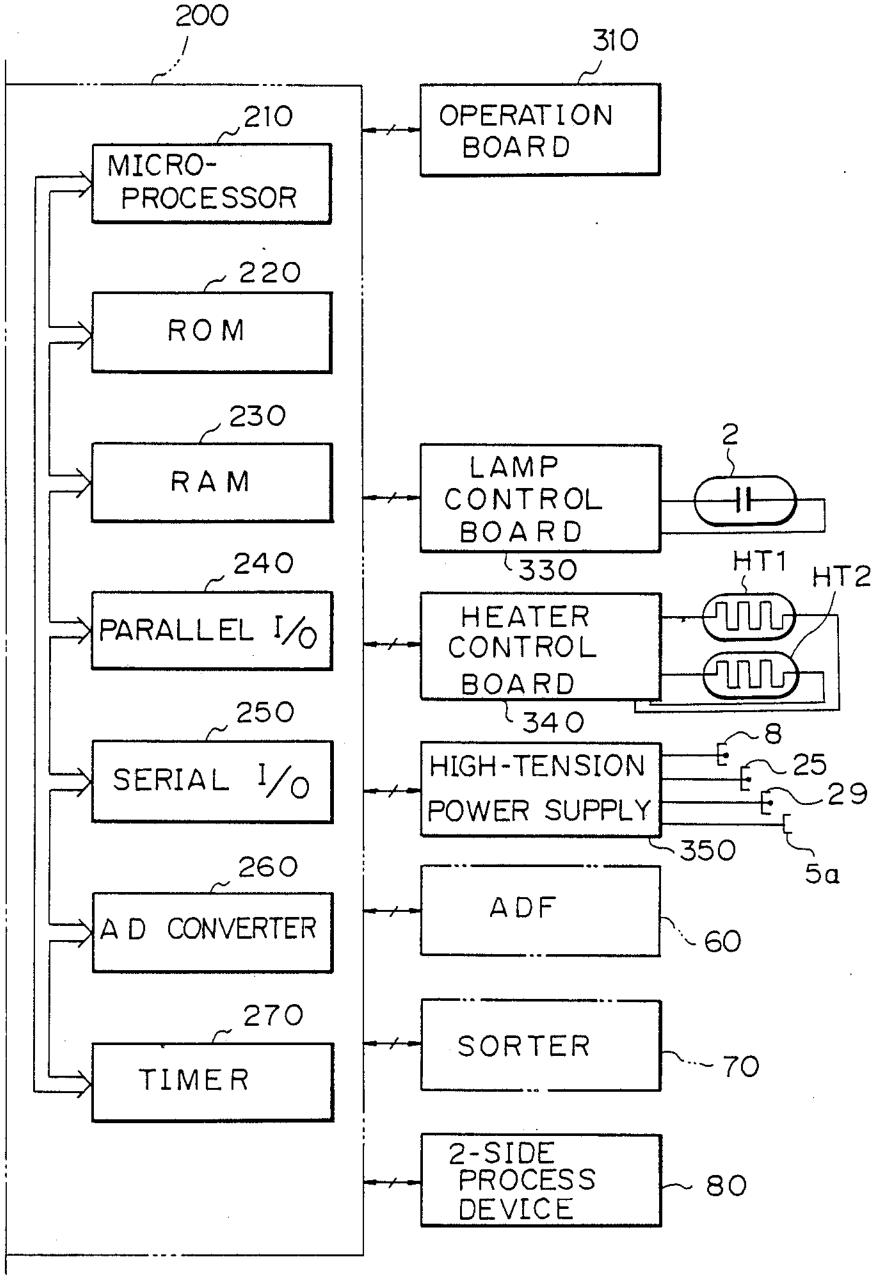

FIGS. 2A and 2B show a specific arrangement of an electric circuit which is included in a control section of the copier shown in FIG. 1. A first embodiment of the present invention will hereinafter be described with reference to FIGS. 2A and 2B.

First Embodiment

A main control board 200 has a microprocessor 210, a ROM (Read Only Memory) 220, a RAM (Random Access Memory) 230, a parallel I/O (Input/Output) port 240, a serial I/O port 250, an AD (Analog-to-Digital) converter 260, and a timer 270. Connected to the main control board 200 are an operation board 310, a lamp control board 330, a heater control board 340 for controlling heating elements HT1 and HT2 of the fixing unit 26, a high-tension power supply unit 350, an automatic document feeder (ADF) 60, a sorter 70, a two-side processing device 80, a paper feed unit 360, an AC driver 370, a DC driver 380, a signal processing circuit 390A, etc. The lamp control board 330 controls the turn-on and turn-off of the lamp 2 as well as the amount of light to issue from the lamp 2. The heater control board 340 turns the heating elements HT1 and HT2 of the fixing unit 26 on and off while controlling the temperature of the elements HT1 and HT2. The high-tension power supply unit 350 controls the turn-on and turn of and the energizing voltages of the main charger 8, a bias electrode **5*a* of the developing unit 11, the transfer and separation chrager 25, and the discharger 29. Various AC loads 400 are connected to the AC driver 370, while various DC loads 410 are connected to the DC driver 380. Various sensors 420 are connected to the signal processing circuit 390A**.

The sensors 420 include the previously mentioned electrometer **420*p* which is responsive to the surface potential of the belt 7. Typical of the AC loads 400 are a main motor for driving a paper feed and transport system, a belt motor for driving the belt 7, a fan motor, and a motor for development. The DC loads 410 include a solenoid for controlling the cleaning unit, a clutch for controlling the register roller, a solenoid for driving a separator pawl, the eraser 10, and a total counter. Further, typical of the sensors 420 are a timing pulse generator for generating pulses in synchronism with the rotation of the main motor, a timing pulse generator for generating pulses in synchronism with the rotation of the belt motor, a paper size sensor, a paper sensor, and the electrometer 420***p*.

The image density sensor 18P is connected to a signal processing circuit 390P. The signal processing circuit 390 delivers to the AD converter 260 of the main control board 200 an analog signal representative of the pattern image density associated with the developed image or toner image on the belt 7 which is representative of the pattern 31 on the glass platen 1. The sensor 15B is connected to a signal processing circuit 390F. This circuit 390F feeds to the AD converter 260 an analog signal which is representative of the toner density of the developer stored in the developing unit 11.

The toner supply roller 17 is provided with a plurality of recesses or channels 17A on its surface, so that the toner received in the channels 17A is introduced into the developing unit 11 as the roller 17 is rotated. A solenoid unit 17MD is connected to a lever (FIG. 2A) which drives the roller 17 in a rotational motion. When the solenoid unit 17MD is energized once, the lever 32 is rotated to in turn rotate the roller 17 by a predetermined angle resulting in the toner received in one channel 17A being fed into the developer 11. The solenoid unit 17MD is connected to a solenoid driver 390S which is in turn connected to the main control board 200.

A density shift command switch 30 is connected to the main control board 200 via a signal processing circuit 390E to allow the adjustable range of reference image density which is set up at the production stage to be varied as desired. The density shift command switch 30 may be implemented for example with a rotary switch 30 having eight independent contacts which are individually labeled "−3", "−2", "−1", "0", "+1", "+2", "+3" and "+4", and a slider selectively engageable with the contacts. This switch 30 is provided independently of the operation board 310, e.g. inside the housing of the copier. The signal processing circuit 390E to which the switch 30 is connected is constituted by an encoder 390. When the slider of the switch 30 is engaged with the contact "−3", for example, the encoder 390 supplies the main control board 200 with data dD representative of −3. Likewise, when the slider of the switch 30 is engaged with the contact "+1", the encoder 390 feeds data dD representative of +1 to the main control board 200. This is also true with the other contacts of the switch 30.

Figures 1, 3A:
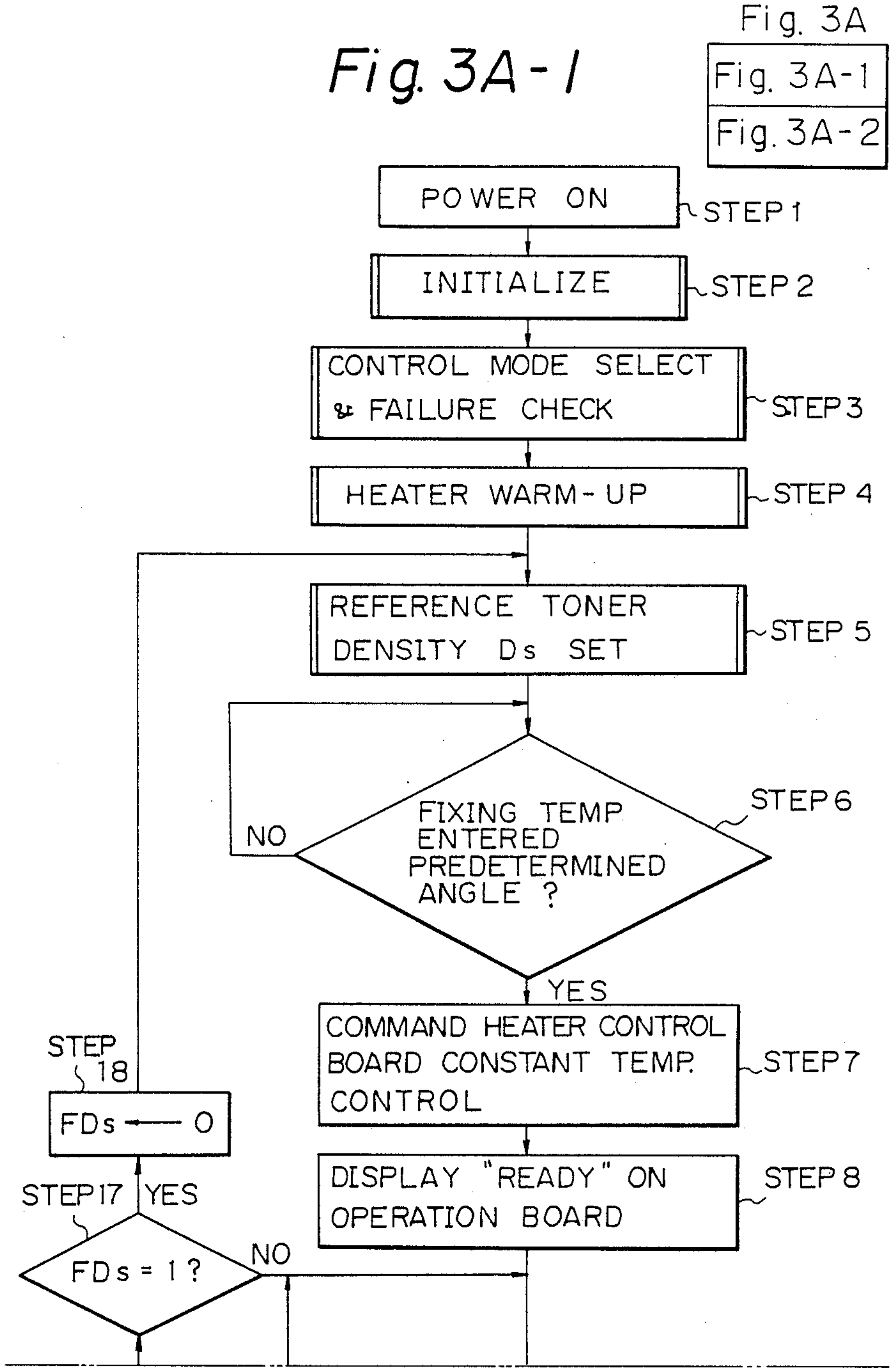
Figures 2, 3A:
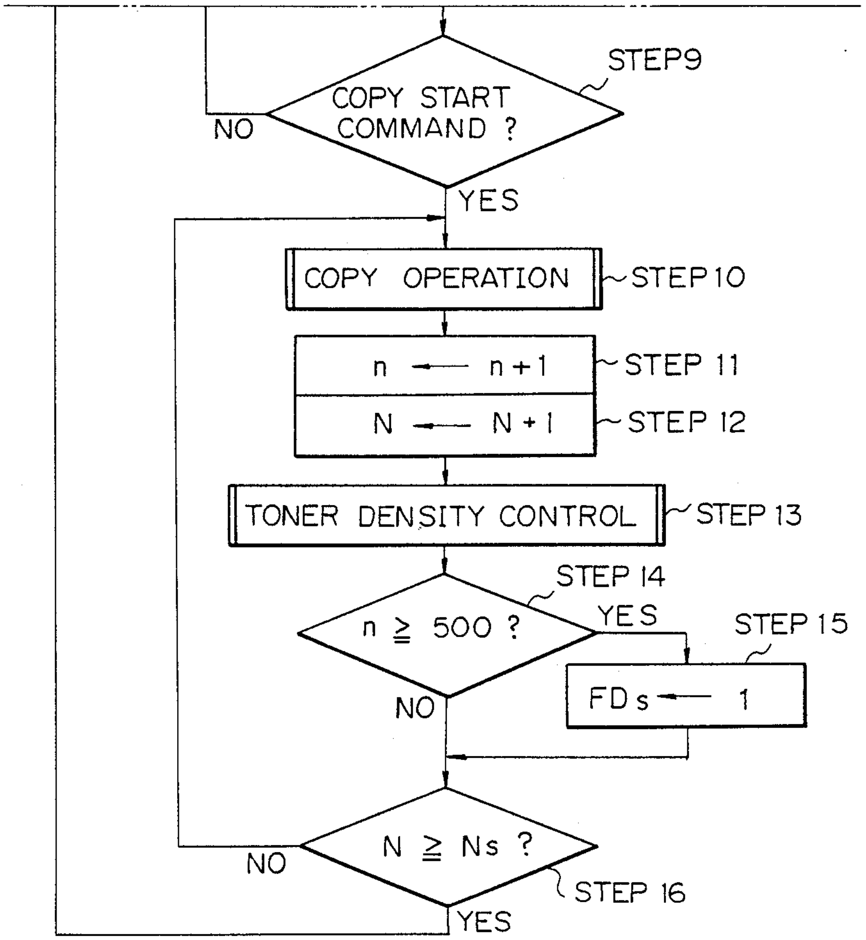

Referring to FIGS. 3A-1 and 3A-2, the control operation of the microprocessor 210 which is included in the main control board 200 is outlined. As shown, when a power switch of the copier is turned on (STEP 1), the microprocessor 210 executes initialization (STEP 2) to control the I/O ports 240 and 250 to a stand-by signal level while clearing internal registers, counters, and timers. Then, the microprocessor 210 determines whether or not any of the ADF 60, sorter 70 and other external units are connected to the copier and, based on the result of the decision, selects a particular control mode (STEP 3). In the STEP 3, the microprocessor 210 further determines whether or not any of the internal units of the copier has failed and, if any of them has failed, remains in a stand-by condition while displaying the failure. If all the units inside the copier are free from failures, the microprocessor 210 delivers a heater warm-up command to the heater control board 340 for warming up the heating elements HT1 and HT2 (STEP 4). Subsequently, the microprocessor 210 executes a REFERENCE TONER DENSITY Ds SET subroutine (STEP 5) which will be described in detail later. This is followed by determining whether or not the fixing temperature of the heating elements HT1 and HT2 has entered a predetermined range (STEP 6). If it lies in the predetermined range, the microprocessor 210 commands the heater control board 340 a constant temperature control (STEP 7). If the actual fixing temperature has not reached the predetermined range, the program waits until the fixing temperature enters the predetermined range. As the fixing temperature reachs the predetermined range, the microprocessor 210 commands the constant temperature control and then displays a message such as "READY" on the operation board 310 (STEP 8).

Then, the microprocessor 210 awaits the operation of a copy start key which is provided on the operation board 310 (STEP 9). When any of the other keys and operating elements are manipulated while the microprocessor 210 is so waiting, the microprocessor 210 reads them and adjusts or changes various copy process conditions or parameters. Upon the operation of the copy start key, the microprocessor 210 activates the copier to produce one copy (STEP 10) and, as one copying cycle is completed, increments a copy count register n (adapted to store the number of times that a copying cycle is executed after the turn-on of the power switch) by 1 (STEP 11). Then, the microprocessor 210 increments a copy count register N (adapted to count copies after the turn-on of the copy start key) by 1 (STEP 12) and then executes a toner density control (STEP 13). Details of the toner density control will be described later.

The microprocessor 210 sees if the content of the register n is greater than 500 (STEP 14) and, if the answer is YES, writes 1 in a flag register FDs to show that the REFERENCE TONER DENSITY Ds SET subroutine (STEP 5) has to be executed (STEP 15). Thereupon, the microprocessor 210 determines whether or not the content of the register N has reached the number of copies (preset number) Ns entered on the operation board 310 (STEP 16). If the answer is NO, the copying operation (STEP 10) is repeated to effect another copying cycle. Upon coincidence of the register N with the number of copies Ns, a copy end cycle is set and the content of the flag register FDs is checked (STEP 17). If the content of the flag register FDs is 1, the microprocessor 210 clears the register FDs (STEP 18) and then executes the REFERENCE TONER DENSITY Ds SET subroutine (STEP 5). If the content of the register FDs is not 1 but 0, the program is transferred to the STEP 9.

By the control operation described above, the REFERENCE TONER DENSITY Ds SET subroutine (STEP 5) is executed when the power switch of the copier is turned on (STEP 1) and when the set number of copies Ns are fully produced after the increase of the total number of copies to 500. On the other hand, the TONER DENSITY CONTROL (STEP 13) is executed for every copying cycle.

Figure 3B:
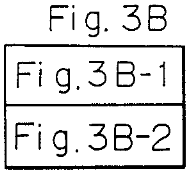
Figure 1:
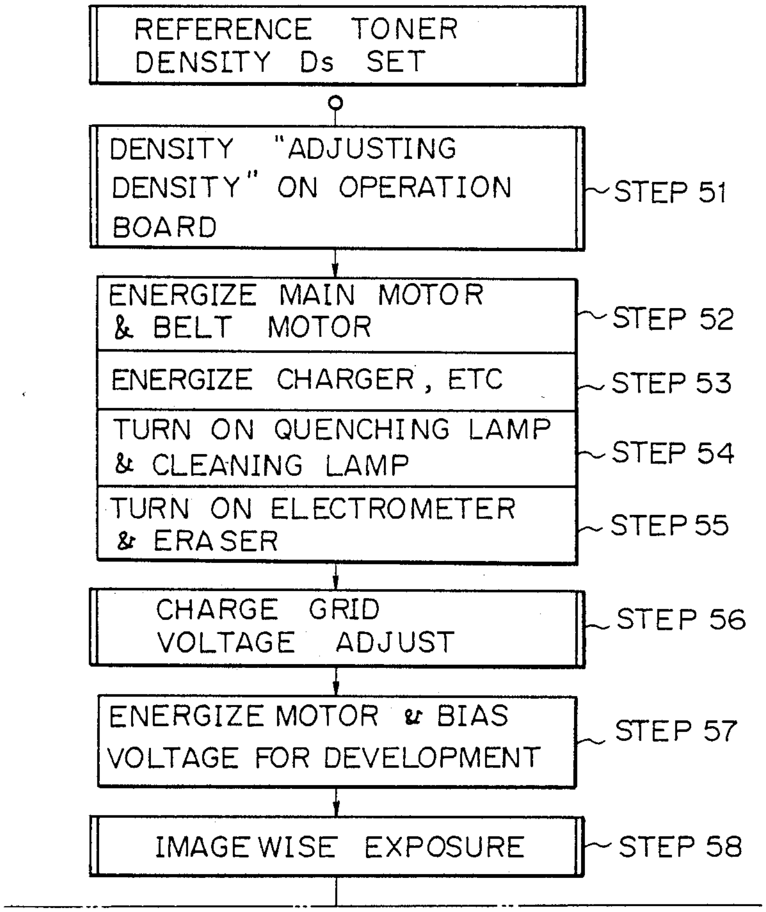
Figures 2, 3B:
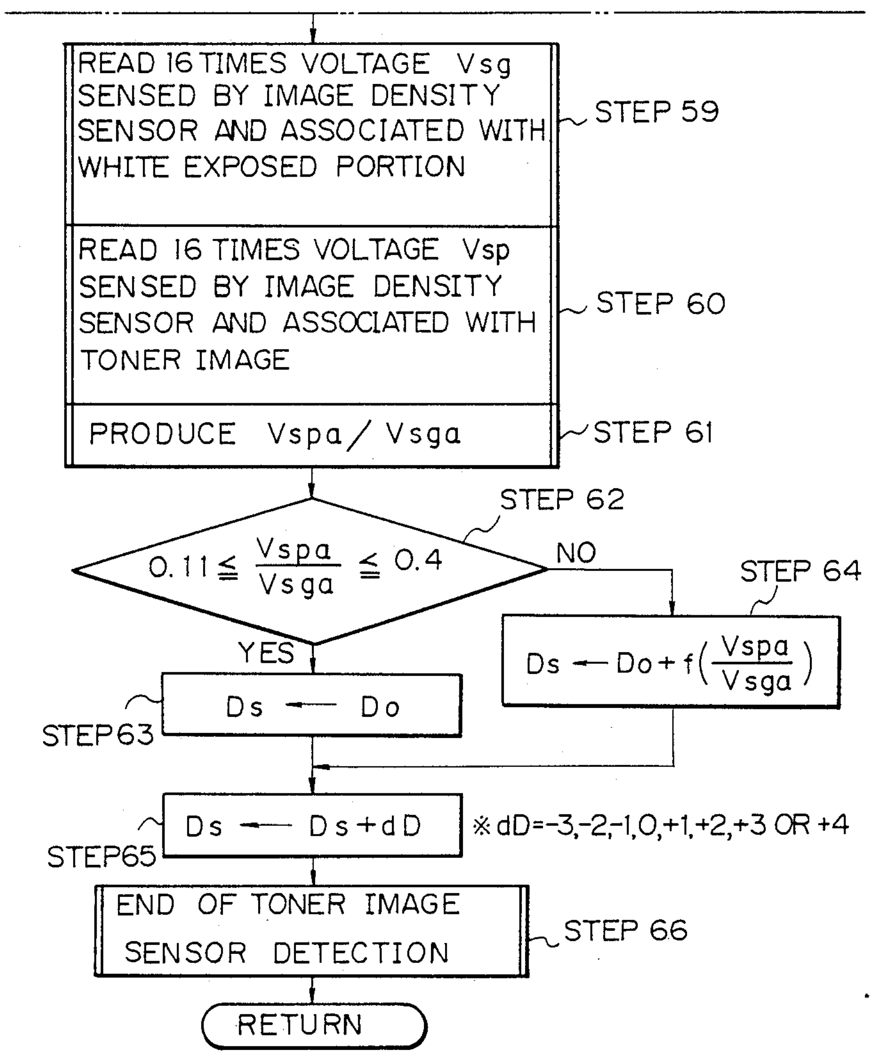

Referring to FIGS. 3B-1 and 3B-2, the REFERENCE TONER DENSITY Ds SET subroutine (STEP 5) is shown in detail. This subroutine begins with displaying on the operation board 310 a message reporting that the image density is being adjusted by the image density sensor 18P, i.e. "ADJUSTING DENSITY" (STEP 51). Then, the microprocessor 210 executes a sequence of processes for forming a latent image of the pattern on the belt 7 (without the supply of a paper sheet) (STEPS 52 to 55). Comparing a potential sensed by the electrometer 420p with a reference value, the microprocessor 210 adjusts the charge grid voltage of the main charger 8 such that the sensed potential coincides with the reference value (STEP 56). Thereafter, the microprocessor 210 drives the motor for development and applies a bias voltage for development (STEP 57). This fully prepares the developing unit 11 for development. Then, the pattern 31 is illuminated to expose the belt 7 imagewise resulting in a latent image being formed on the belt 7 (STEP 58). After the latent image has been developed by the toner, the image density sensor 18P senses the density of the toner image (STEPs 59 and 60). In this instance, the microprocessor 210 reads the output voltage Vsg of the image density sensor 18P associated with a white exposed portion located outside of the pattern 31 (high level if the reflectivity is high) time-serially sixteen consecutive times (STEP 59), and it reads the output voltage Vsp of the image density sensor 18P associated with the toner image representative of the black area inside the pattern 31 (high level if the reflectivity is high and lower than the voltage Vsg) sixteen consecutive times (STEP 60). The microprocessor 210 produces a mean value Vsga of the read voltages Vsg and a mean value Vspa of the read voltages Vsp and then a ratio Vspa/Vsga (STEP 61).

Subsequently, the microprocessor 210 determines whether or not the ratio Vspa/Vsga is greater than 0.11 and smaller than 0.4 (STEP 62). If the answer is YES, meaning that the actual density is the standard or designed density of the copier, the microprocessor 210 writes a reference toner density value Do associated with the standard density in the reference toner density register as reference toner density Ds (STEP 63). If the ratio Vspa/Vsga does not lie in the above-mentioned range, the microprocessor 210 adds a correction amount of plus or minus f(Vspa/Vsga) associated with the deviation to the reference value Do (or in effect subtracts it in the case of a negative correction amount). The resulting sum is written in the reference toner density register as the reference toner density Ds (STEP 64).

The value stored in the reference toner density register as stated above is indicative of particular toner density for setting up standard density which lies in the range of 0.11 to 0.4 with respect to the ratio Vspa/Vsga, i.e. standard density of toner. More specifically, when toner density in the developer stored in the developing unit 11 is selected to be the standard density, the ratio Vspa/Vsga lies in the range of 0.11 to 0.4.

Thereafter, the microprocessor 210 reads output data of the signal processing circuit 390E (representative of −3, −2, −1, 0, +1, +2, +3 or +4), adds it to the content of the reference toner density register, and updates the register with the sum (STEP 65). Consequently, the content of the reference toner density register is changed to a value which involves a correction value selected by the density shift command switch 30. If the image density is shifted to a higher value, the reference toner density of the developing unit 11 will be shifted to a higher side to in turn increase the actual image density beyond the standard density. Conversely, if the image density is shifted to a lower value, the image density will be reduced beyond the standard density. In this manner, the amount of shift of the image density is dictated by the switch 30.

As stated above, when the reference toner density Ds is written in the reference toner density register, the microprocessor 210 clears all of the conditions which are set for the operation of the image density sensor and, instead, sets up an end cycle (STEP 66). Then, the program is transferred to the STEP 6 of the main routine shown in FIG. 3A-1 to see if the fixing temperature has become higher than a predetermined level. If the fixing temperature is higher than the predetermined level, the microprocessor 210 commands the heater control bord 340 a constant temperature control (STEP 7), displays "READY" on the operation bord 310 (STEP 8), and executes the STEP 9.

Figure 3C:
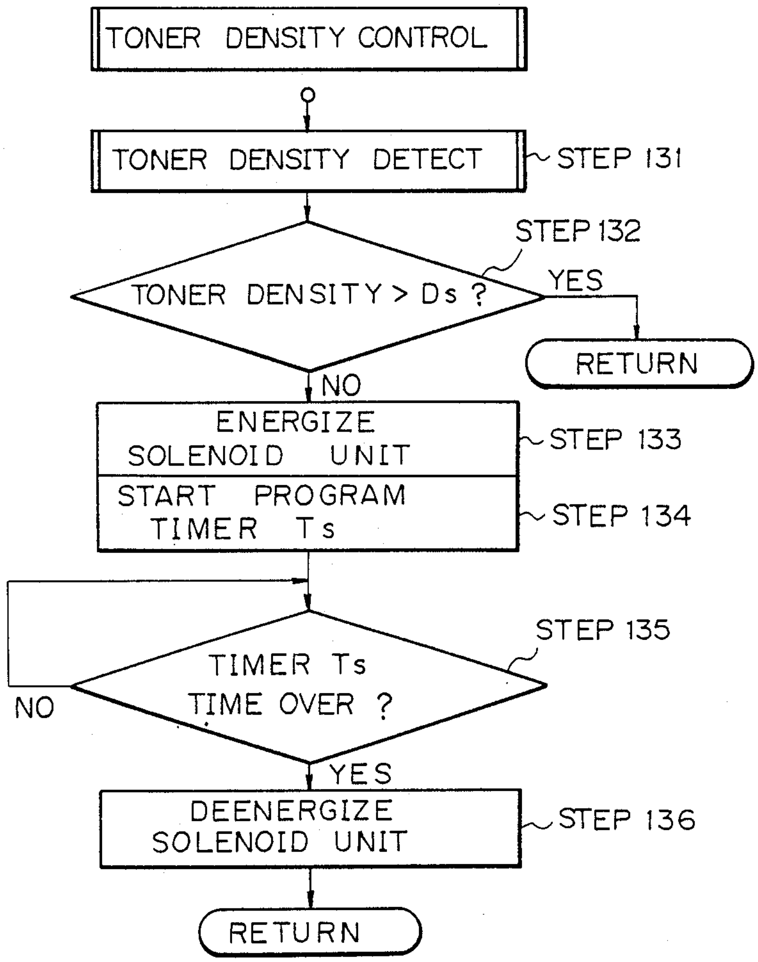

Referring to FIG. 3C, the TONER DENSITY CONTROL subroutine (STEP 13) is shown in detail. In this subroutine, the microprocessor 210 reads a voltage representative of toner density in the developing unit 11 which is sensed by the toner density sensor 15F, by converting it into a digital value (STEP 131). Then, the microprocessor 210 determines whether or not the read toner density is higher than the reference toner density Ds which has been stored in the reference toner density register (STEP 132). If the answer is YES, the program is directly transferred to the STEP 14 of the main routine. If it is NO, the microprocessor 210 energizes the solenoid unit 17MD (STEP 133), starts a program timer Ts (STEP 134), waits until the time of the program timer Ts expires (STEP 135), deenergizes the solenoid unit 17MD upon the expiration of the time (STEP 136), and returns to the STEP 14 of the main routine. While the solenoid unit 17MD is so energized for the period of time of Ts, the lever 32 (FIG. 2A) is rotated once downward to in turn rotate the toner supply roller 17 (FIGS. 1 2A and 2B) by a predetermined angle and, as a result, the toner is fed from one of the recesses 17A of the roller 17 into the developing unit 11.

To summarize the embodiment discussed above, a value selected by the density shift command switch 30 is added to the toner density value Do which is necessary to control the actual image density to the standard image density (Vspa/Vsga lying in the range of 0.11 to 0.4). The sum, i.e., the reference toner density Ds and the toner density sensed by the toner density sensor 15F are compared to determine whether or not a toner should be supplemented. Alternatively, an arrangement may be made such that the value Vspa/Vsga sensed by the image density sensor is corrected by a value commanded by the switch 30 and, based on the corrected value, the reference toner density Ds is set and compared with the toner density sensed by the toner density sensor. Another alternative arrangement may be such that reference density associated with Vspa/Vsga ranging from 0.11 to 0.4 is set and compared with a value which is produced by adding a value commanded by the switch 30 to or subtracting it from the toner density sensed by the toner density sensor.

In accordance with this particular embodiment:

(1) when no density shift command is entered on the density shift command switch 30 or when the density commanded by the switch 30 is zero, image development is effected with toner density represented by a toner density basis which is set in association with the density sensed by the toner density sensor, and with a standard density adjustable range which conforms to the hardware and process conditions of various structural elements of the image recorder;

(2) when the switch 30 is manipulated to command a density shift greater than zero, toner density higher than the standard density by the commanded shift is set up. Hence, despite that the hardware and process conditions of the structural elements are the same, development is performed with a higher density adjustable range; and (3) when the switch 30 is operated to command a density shift smaller than zero, the toner density is reduced by the commanded shift and, hence development is performed with a lower density adjustable range with the hardware and process conditions being maintained the same.

The toner density control device, therefore, allows an operator or a serviceman to change the adjustable range of the standard density by commanding a desired density shift through the switch 30 and thereby to produce a reproduction whose density is higher than or lower than the above-mentioned range, broadening the applicable range of an image recorder. Since the hardware and process conditions do not have to be changed or modified as stated above, the broader range of application of an image recorder can be implemented with ease.

Hereinafter will be described a second embodiment of the present invention.

Second Embodiment

Figures 4, 4A:
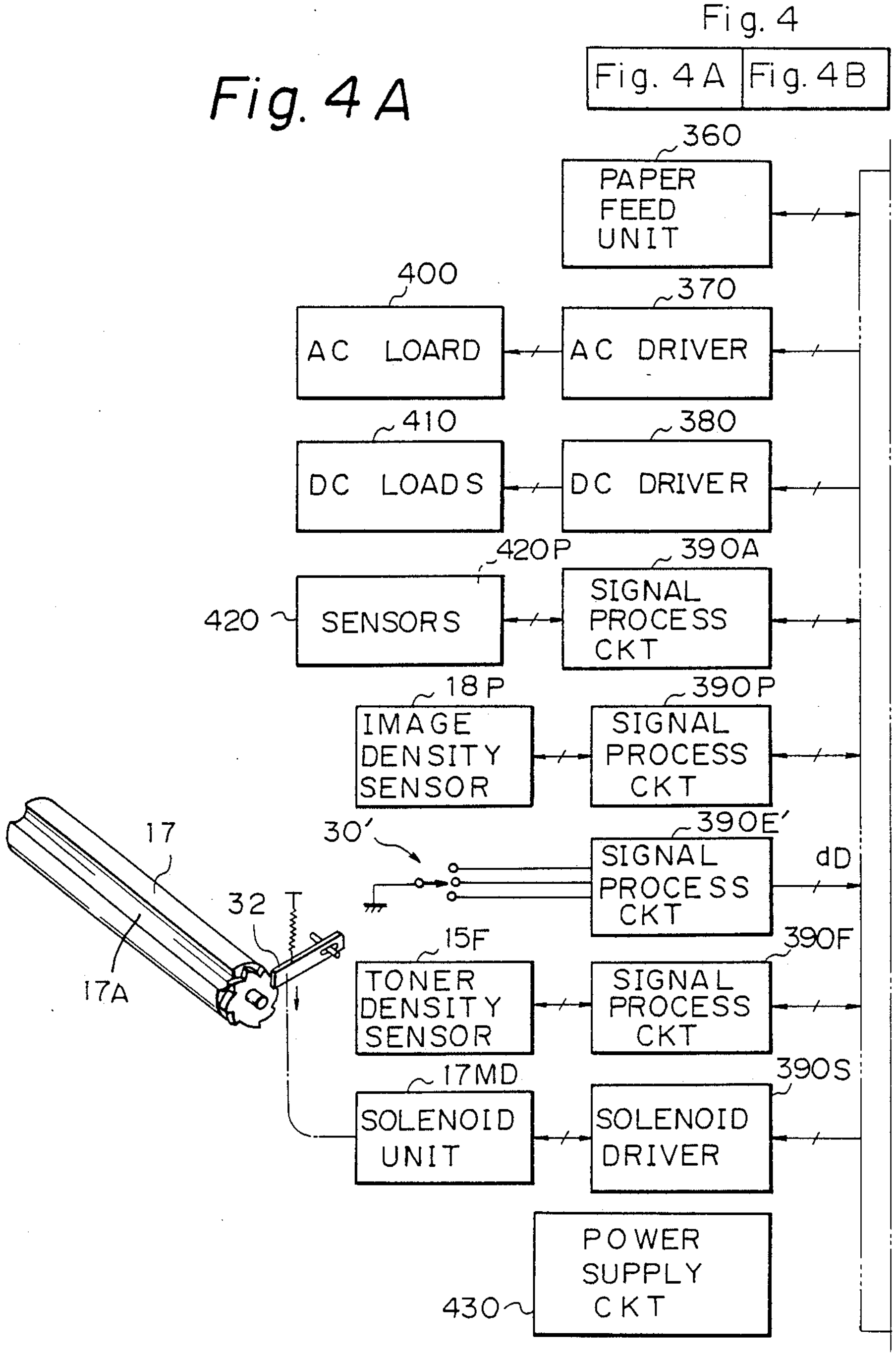
FIGS. 4A and 4B are schematic block diagrams showing an alternative arrangement of the electric circuit installed in the control section.
Figure 4B:
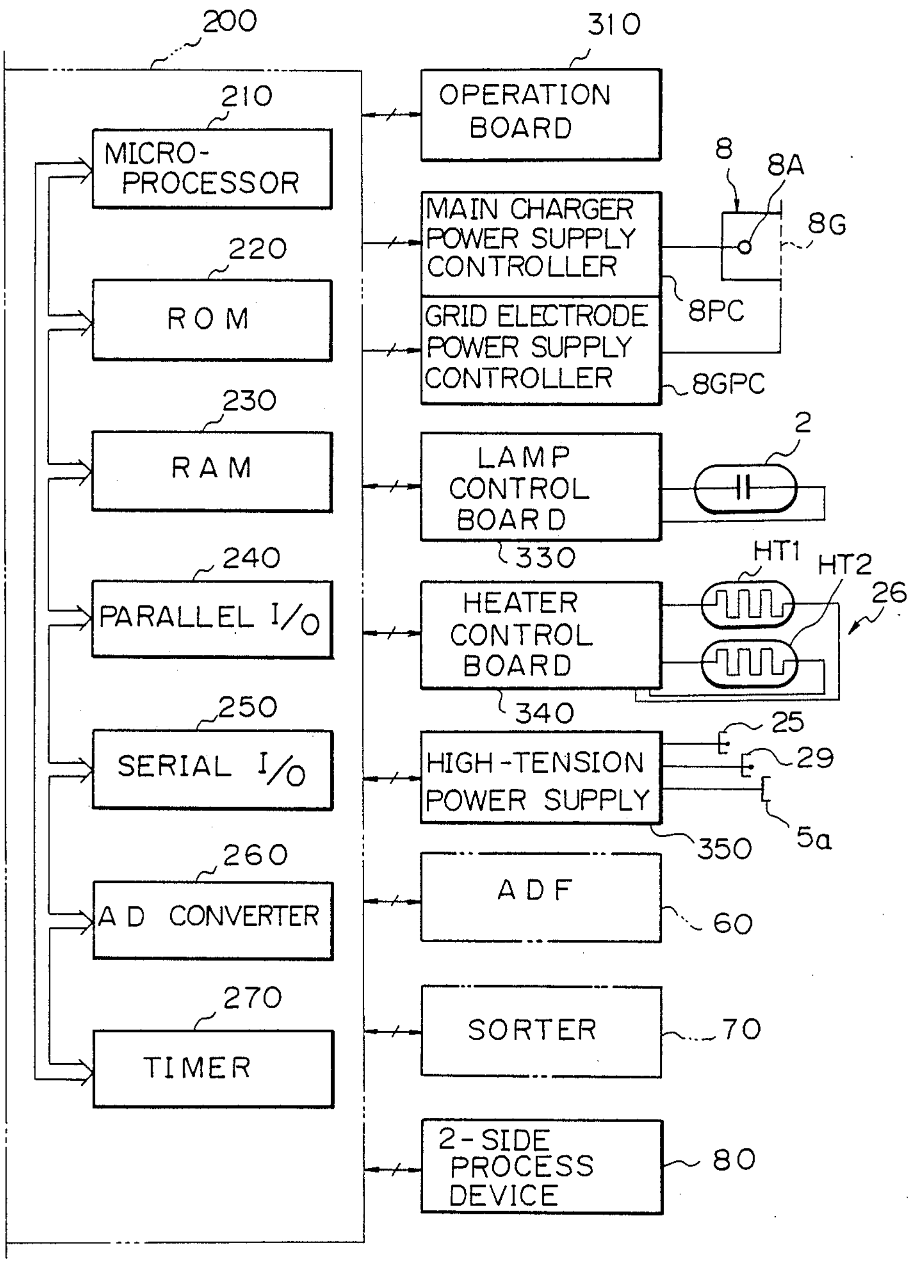

Referring to FIGS. 4A and 4B, an alternative arrangement of the electric circuit which is included in the control section of the copier shown in FIG. 1 is shown. The second embodiment of the present invention is applied to this control section. In FIGS. 4A and 4B, the same or similar structural elements as those shown in FIGS. 2A and 2B are designated by like reference numerals, and details thereof will not be described to avoid redundancy.

The control section shown in FIGS. 4A and 4B is different from the control section of FIGS. 2A and 2B in that a controller 8PC for controlling the power supply associated with a corona wire 8A of the main charger 8 and a controller 8GPC for controlling the power supply associated with a grid electrode 8G of the main charger 8 are connected to the main control board 200, and in that a density shift command switch 30′ and a signal processing circuit 390E′ associated therewith are different in construction from those shown in FIGS. 2A and 2B. Specifically, the controller 8PC controls the on/off of the main charger 8 and the charger voltage applied to the corona wire 8A of the main charger 8, while the controller 8GPC controls the on/off of the grid electrode 8G of the main charger 8 and the grid voltage applied thereto. The density shift command switch 30′ is implemented as a rotary switch having three contacts individually labeled "U (up)", "N (neutral)" and "D (down)", and a slider selectively engageable with such contacts. The switch 30′, like the switch 30, is provided independently of the operation board 310, e.g. within the housing of the copier. Connected to the switch 30′, the signal processing circuit 390E′ delivers to the main control board 200 a signal dS representative of a particular contact of the switch 30′ to which the slider is engaged.

In the second embodiment, the microprocessor 210 of the main control board 200 is operated in exactly the same manner as shown in FIG. 3A-1. The TONER DENSITY CONTROL subroutine (STEP 13) of FIG. 3A-2, i.e., the sequence of steps shown in FIG. 3C are also executed in this embodiment.

Figure 5:
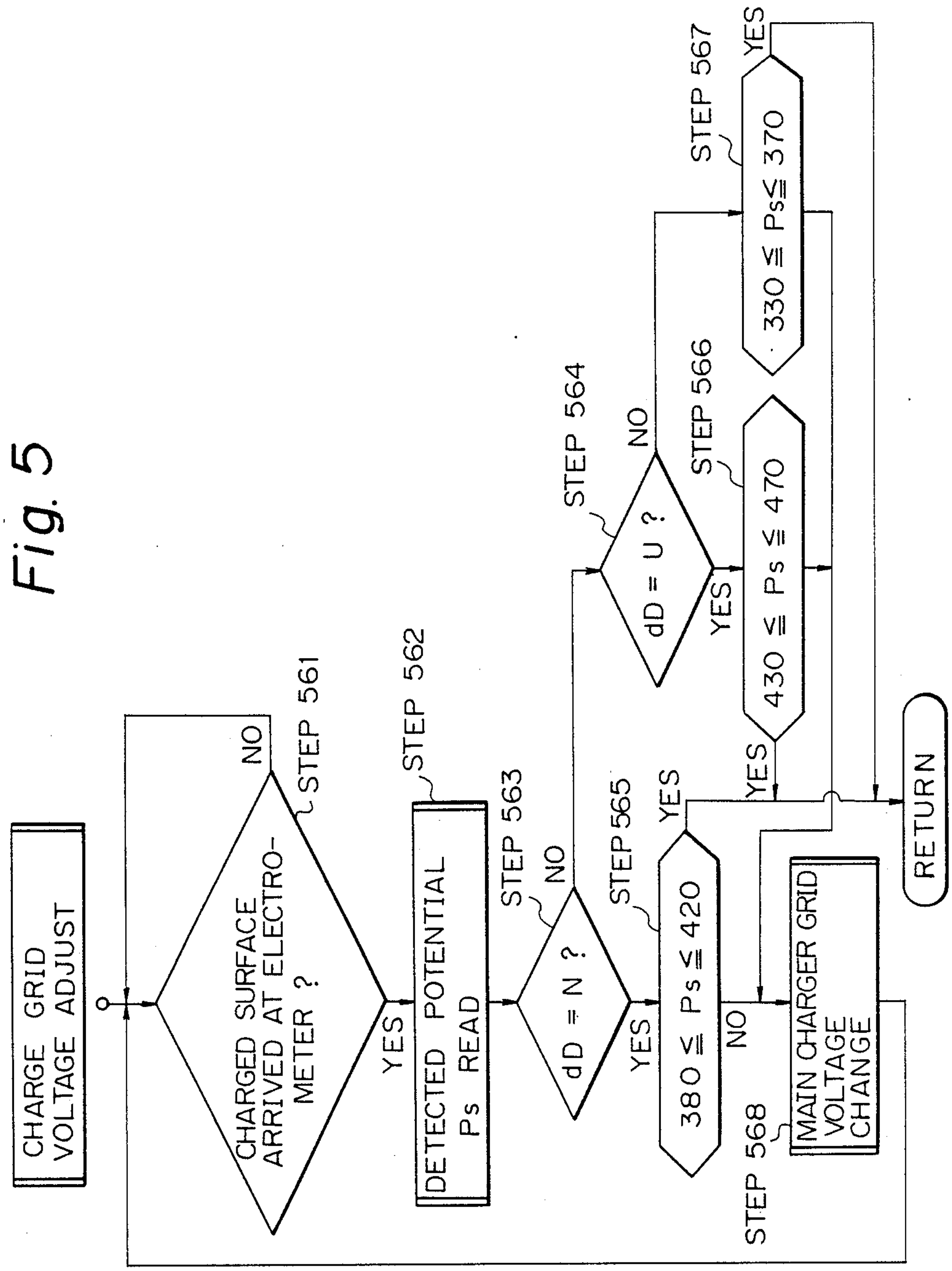
FIG. 5 is a flowchart representative of a CHARGE GRID VOLTAGE ADJUST subroutine included in the main routine of FIGS. 3B-1 and 3B-2.

A reference will be made to FIG. 5 for describing the CHARGE GRID VOLTAGE ADJUST subroutine (FIG. 3B-1, STEP 56) associated with the main charger 8 and executed in the second embodiment. As shown in FIG. 5, the microprocessor 210 waits until the surface of the belt 7 charged by the main charger 8 arrives at the electrometer 420P (STEP 561), and upon the arrival, reads a potential Ps sensed by the electrometer 420P (STEP 562). Then, the microprocessor 210 determines with which of the contacts U, N and D of the density shift command switch 30′ the slider is engaged (STEPs 563 and 564) and compares a potential associated with that contact with the sensed potential Ps (STEPs 565 to 567). If the switch 30′ is held in the N position which designates a surface potential range of 380 V to 420 V and if the sensed surface potential Ps does not lie in such a range, the microprocessor 210 varies the grid voltage of the main charger 8 to confine the potential Ps in the above-mentioned range. If the switch 30′ is in the U position which designates a surface potential range of 430 V to 470 V and if the actual potential Ps does not lie in such a range, the microprocessor 210 varies the grid voltage to control the potential Ps to the above-mentioned range (STEP 568). Further, if the switch 30′ is in the D position which designates a surface potential range of 330 V to 370 V and if the actual potential Ps does not lie in such a range, the microprocessor 210 varies the grid voltage to confine the potential Ps in the above-mentioned range (STEP 565). After so varying the grid voltage, the program waits until the belt surface charged by the new grid voltage of the main charger 8 arrives at the electrometer 420P (STEP 561). As soon as such a belt surfaces reaches the electrometer 420P, the microprocessor 210 reads a potential Ps sensed by the electrometer 420P (STEP 562). When the sensed potential Ps reaches a value which is determined by a command from the switch 30′, the operation advances to the STEP 57 of FIG. 3B for turning on the motor for developing and applying a bias voltage for development.

As stated above, in the second embodiment of the present invention, the grid voltage of the main charger 8 is so adjusted as to control the surface potential of the belt 7 before exposure to a value which is determined by a command from the switch 30′, then the belt surface with such a surface potential is exposed by an imagewise reflection from the pattern 31, then the resulting latent image on the belt surface is developed by the developing unit 11 to produce a toner pattern, and then the density of this toner pattern is sensed by the image density sensor.

In this embodiment, the REFERENCE TONER DENSITY Ds SET subroutine (FIG. 3A-1, STEP 5) is exactly the same as the sequence of steps shown in FIG. 3B-1 except for the STEP 56.

The second embodiment has been shown and described as adjusting the grid voltage of the main charger 8 by selecting a surface potential before imagewise exposure, the voltage applied to the corona wire 8A of the main charger 8 may be adjusted in place of the grid voltage. If desired, the switch 30′ may be constructed to select a particular amount of imagewise exposure for causing the actual amount of exposure to be adjusted or to select a particular bias voltage for development for causing the actual bias voltage to be adjusted. Furthermore, the pattern 31 may be replaced with a liquid crystal display or similar display to allow the image density associated with the pattern 31 to be adjusted by selecting particular display density on the switch 30′.

In summary, it will be seen that the present invention provides a toner density control device for an image recorder which allows a person to change image density as desired without resorting to the changes or modifications of the hardware and process conditions of various structural elements and units. An operator of the image recorder or a serviceman can freely select desired image density higher than or lower than a designed or standard density range by manipulating a density shift command switch. This significantly broadens the applicable range of the image recorder.

Various modifications will become possible for those skilled in the art after receiving the teachings of the present disclosure without departing from the scope thereof.

What is claimed is:

1. A toner density control device for an image recorder which develops an electrostatic latent image of a predetermined pattern formed on an image carrier by using a toner of a developer which is stored in a developing device, comprising:

pattern density sensor means for sensing density of a developed image of the predetermined pattern;

toner density sensor means for sensing toner density of the developer;

toner supply means for supplying toner to said developing device;

commanding means for commanding an amount of shift of the density of the image; and control means for setting a toner density basis in association with the density of the image sensed by said pattern density sensor means and controlling said toner supply means in response to the amount of shift commanded by said commanding means, the set toner density basis and the toner density sensed by said toner density sensor such that said toner supply means is activated to supply toner to said developing device only when the sensed density of the image is lower than density represented by a sum of the toner density basis and the commanded amount of shift.

2. A toner density control device for an image recorder which develops by an imagewise exposing device an electrostatic latent image formed on an image carrier which has been charged by a charging device by using a toner of a developer which is stored in a developing device, said toner density control device comprising:

commanding means for commanding a value of an image forming parameter which has influence on density of the predetermined pattern to be developed;

pattern image forming means for forming the predetermined pattern image on said image carrier by using the image-forming parameter having the value commanded by said commanding means;

pattern image density sensor means for sensing density of the developed pattern image;

toner density sensor for sensing toner density of the developer;

toner supply means for supplying the toner to said developing device; and control means for setting a toner density basis in association with the pattern image density sensed by said pattern image density sensor means and controlling said toner supply means in response to the toner density basis and the toner density sensed by said toner density sensor means such that said toner supply means is activated to supply the toner to said developing device when the sensed pattern image density is lower than the toner density basis.

3. A device as claimed in claim 2, wherein the image-forming parameter comprises:

a surface potential of said image carrier.

4. A device as claimed in claim 3, wherein the image-forming parameter comprises:

a grid voltage of said charging device.

5. A device as claimed in claim 3, wherein the image-forming parameter comprises:

a wire voltage of said charging device.

6. A device as claimed in claim 3, wherein the image-forming parameter comprises:

density of the predetermined pattern.

7. A device as claimed in claim 3, wherein the image-forming parameter comprises:

a quantity of light issuing from said imagewise exposing device.

* * * * *